United States Patent
Strauss et al.

(10) Patent No.: US 11,704,575 B2
(45) Date of Patent: Jul. 18, 2023

(54) NEURAL NETWORKS IMPLEMENTED WITH DSD CIRCUITS

(71) Applicant: MICROSOFT TECHNOLOGY LICENSING, LLC, Redmond, WA (US)

(72) Inventors: Karin Strauss, Seattle, WA (US); Luis Ceze, Seattle, WA (US); Johannes Staffan Anders Linder, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1244 days.

(21) Appl. No.: 16/230,928

(22) Filed: Dec. 21, 2018

(65) Prior Publication Data
US 2020/0202223 A1    Jun. 25, 2020

(51) Int. Cl.
*G06N 3/12*    (2023.01)
*G06N 3/04*    (2023.01)
*G06N 3/08*    (2023.01)
*G06N 3/123*    (2023.01)

(52) U.S. Cl.
CPC ............. *G06N 3/123* (2013.01); *G06N 3/04* (2013.01); *G06N 3/08* (2013.01)

(58) Field of Classification Search
CPC ............. G06N 3/04; G06N 3/08; G06N 3/123
See application file for complete search history.

(56) References Cited

U.S. PATENT DOCUMENTS 9,990,687 B1    6/2018 Kaufhold et al.

OTHER PUBLICATIONS

Shi, Lanlan, Changjun Zhou, and Qiang Zhang. "The neuronal perceptron with DNA strand displacement." 2018 Tenth International Conference on Advanced Computational Intelligence (ICACI). IEEE, 2018. (Year: 2018).*
Lakin, Matthew R., and Darko Stefanovic. "Supervised learning in adaptive DNA strand displacement networks." ACS Synthetic Biology 5.8 (2016): 885-897. (Year: 2016).*
Song, Tianqi, et al. "Analog computation by DNA strand displacement circuits." ACS synthetic biology 5.8 (2016): 898-912. (Year: 2016).*

(Continued)

*Primary Examiner* — Benjamin P Geib
(74) *Attorney, Agent, or Firm* — Benjamin A. Keim; Newport IP, LLC

(57) ABSTRACT

Neural networks can be implemented with DNA strand displacement (DSD) circuits. The neural networks are designed and trained in silico taking into account the behavior of DSD circuits. Oligonucleotides comprising DSD circuits are synthesized and combined to form a neural network. In an implementation, the neural network may be a binary neural network in which the output from each neuron is a binary value and the weight of each neuron either maintains the incoming binary value or flips the binary value. Inputs to the neural network are one more oligonucleotides such as synthetic oligonucleotides containing digital data or natural oligonucleotides such as mRNA. Outputs from the neural networks may be oligonucleotides that are read by directly sequencing or oligonucleotides that generate signals such as by release of fluorescent reporters.

5 Claims, 6 Drawing Sheets

(56) References Cited

OTHER PUBLICATIONS

Wang, Zicheng, et al. "The design of digital circuit based on DNA strand displacement reaction." Bio-Inspired Computing—Theories and Applications: 10th International Conference, BIC-TA 2015 Hefei, China, Sep. 25-28, 2015, Proceedings 10. Springer Berlin Heidelberg, 2015. (Year: 2015).*
Qian, Lulu, Erik Winfree, and Jehoshua Bruck. "Neural network computation with DNA strand displacement cascades." nature 475. 7356 (2011): 368-372. (Year: 2011).*
Benenson, Yaakov, "Biomolecular Computing Systems: Principles, Progress and Potential", In Journal of Nature Reviews Genetics, vol. 13, Issue 7, Jun. 12, 2012, pp. 455-468.
Ezziane, Zoheir, "DNA Computing: Applications and Challenges", In Journal of Nanotechnology, vol. 17, No. 2, Dec. 21, 2005, 13 Pages.
"International Search Report and Written Opinion Issued in PCT Application No. PCT/US2019/066105", dated Jun. 23, 2020, 18 Pages.
Cardelli, et al., "Two-Domain DNA Strand Displacement", In Journal of Mathematical Structures in Computer Science, vol. 23, Issue 2, Jun. 2010, pp. 47-61.
Cherry, et al., "Scaling Up Molecular Pattern Recognition with DNA-based Winner-take-all Neural Networks", In International Journal of Science—Nature, vol. 559, Issue 7714, Jul. 4, 2018, 19 Pages.
Qian, et al., "Neural Network Computation with DNA Strand Displacement Cascades", In International Journal of Science—Nature, vol. 475, Issue 7356, Jul. 20, 2011, pp. 368-372.
Qian, et al., "Scaling Up Digital Circuit Computation with DNA Strand Displacement Cascades", In Science, vol. 332, Issue 6034, Jun. 3, 2011, pp. 1196-1201.
Lopez, et al., "A Molecular Multi-Gene Classifier For Disease Diagnostics", In Nature Chemistry, Apr. 30, 2018, vol. 10, Issue 7, pp. 746-754.
Qian, et al., "A Simple DNA Gate Motif for Synthesizing Large-scale Circuits", In Journal of the Royal Society Interface, Feb. 4, 2011, pp. 1281-1297.
Lakin, et al., "Abstractions for DNA Circuit Design", In Journal of The Royal Society Interface, Jul. 20, 2011, pp. 470-486.
Hubara, et al., "Binarized Neural Networks", In 30th Conference on Neural Information Processing Systems, 2016, pp. 1-9.
Thubagere, et al., "Computer-aided Systematic Construction of Large-scale DNA Strand Displacement Circuits Using Unpurified Components", In Nature Communications, Issue 8, Feb. 23, 2017, pp. 1-12.
Muscat et al., "DNA-based Molecular Architecture with Spatially Localized Components", In ACM SIGARCH Computer Architecture News, vol. 41, Issue 3, Jun. 23, 2013, pp. 1-12.
Zhang, et al., "Dynamic DNA Nanotechnology Using Strand-displacement Reactions", In Nature Chemistry, vol. 3, Issue 2, Jan. 24, 2011, pp. 103-113.
Seelig, et al., "Enzyme-free Nucleic Acid Logic Circuits", In Journal of Science, vol. 314, Issue 5805, Dec. 8, 2006, pp. 1585-1588.
Ruiz-Perez, et al., "Logic Gates Made with DNA", In Innovative Computer Architectures and Concepts Seminar, Jul. 2002, 19 Pages.
Seelig, et al., "Time-Complexity of Multilayered DNA Strand Displacement Circuits", In International Workshop on DNA Based Computers, Jun. 8, 2009, pp. 144-153.
Lakin, et al., "Visual DSD: A Design and Analysis Tool for DNA Strand Displacement Systems", In Journal of Bioinformatics Applications Note, vol. 27, Issue 22, Oct. 7, 2011, pp. 3211-3213.

* cited by examiner

NEURAL NETWORKS IMPLEMENTED WITH DSD CIRCUITS

BACKGROUND

Neural networks are problem-solving constructs based loosely on the structure of neurons in the brain. All neural networks contain multiple interconnected neurons that each process incoming signals and generate outgoing signals ultimately resulting in an output or result from the neural network. The types of problems neural networks are well-suited to solve include classification and clustering. Classification matches a new unknown item with a class of known items. Classification typically involves training the neural network with multiple examples of objects that belong to a known class. One type of classification is the recognition of handwritten digits. Clustering typically involves grouping items by features that are similar to each other. For example, clustering can group credit card transactions and flag those transactions that do not cluster with others, anomalies, as potentially fraudulent transactions. Neural networks are implemented on electronic computer systems using transmission of electric current across silicon chips. However, implementation of neural networks is not limited to only conventional electronic computing systems.

Molecular computing is the science of using molecules to process information and perform computations. Deoxyribonucleic acid is a biological molecule that has been used to perform computational functions. Natural DNA typically exists in double-stranded configurations in which two strands of DNA form a double helix as a result of individual bases on the two strands annealing or hybridizing to each other. The annealing is reversible and single strands of DNA join together to form a dsDNA structure and the later separate or form dsDNA structures with other ssDNA strands. The biological sciences have provided a wealth of knowledge regarding synthesis and manipulation of DNA strands. Patterns and conditions for ssDNA to hybridize and form dsDNA have been thoroughly studied. It is possible to copy DNA through the use of enzymes. It is also possible to readily synthesize DNA strands with any desired sequence. Although quite different from conventional computing using electrical signals and silicon chips, molecular computing can also provide a modular and flexible computational system by leveraging knowledge gained about DNA as a biological molecule to create structures that behave in ways that are quantitative and reproducible.

Much of the work with DNA computing involves custom-made computing systems that lack flexibility and can only to solve a single problem. While these types of systems illustrate proof-of-concept for DNA computing, they are generally not scalable and not adaptable to addressing new problems without being completely redesigned.

SUMMARY

This disclosure provides techniques for implementing neural networks using DNA in a way that provides flexibility for the neural network design implementation and is not limited to a specific structure or type of computational problem or neural network. These techniques using a hybrid process of silicon-design and molecular implementation to create neural networks. A neural network is initially designed and trained on a conventional electronic computer, "in silico," taking into account the limitations and features of DNA strand displacement (DSD) circuits. Thus, the design and training stages are in some ways similar to the design of conventional computer-implemented neural networks but also differs because the neural network will be implemented with DNA molecules not electronic signals.

The neural network uses DNA strand displacement gates to read, process, and output information. DSD gates function, broadly speaking, by an incoming ssDNA strand displacing one of the two DNA strands in a dsDNA molecule. The displaced ssDNA strand from a first gate can be used as input for a second gate creating a cascade of reactions that, if properly designed, can perform sophisticated computation. One type of DSD gates are "seesaw" gates. Seesaw gates are described in Lulu Qian & Erik Winfrey, *Scaling up Digital Circuit Computation with DNA Strand Displacement Cascades*, 332 Science 1196 (2011). Another type of DSD gates are called "two-domain" gates or "nicked double-stranded DNA" gates. Two-domain gates are described in Luca Cardelli, *Two-domain DNA strand displacement*, 23 Math. Struct. in Comp. Science 247 (2013). A neural network may be built with either or both of seesaw gates and two-domain gates as well as with any other type of DSD gate.

The subunits of a neural network are "neurons," and in a neural network implemented with DSD gates, a neuron is made up of one or more DSD gates. The collection of DSD gates that make up a single neuron perform the function of a neuron by receiving one or more incoming signals from other neurons, performing an operation based on the combined incoming signals, and generating an output that is passed to one or more other neurons in the network. The output is based on a result of the operation performed by the neuron and on a weight assigned to the neuron. Both inputs and outputs are implemented as ssDNA strands. The initial inputs to the neural network are also provided as ssDNA strands. The ultimate output from the neural network may be ssDNA strands or a visible signal such as light generated by a fluorescent reporter.

Training of the neural network, which is performed on a conventional computer, can include providing multiple labeled examples of items to be classified and allowing the neural network to repeatedly vary weights applied to neurons to improve the accuracy of its classification. The weights, once identified, can be implemented in the DSD gates by changing the concentration of certain DNA strands in a neuron in the case of analog neural networks or by changing the sign applied by the neuron in the case of binary neural networks. The connections between various neurons within the neural network are implemented by using the ssDNA output from a first neuron as an input for a second neuron. Thus, the design and training of the neural network informs the design of DSD gates including the DNA sequence of portions of the DSD gates, the structure of the DSD gates, and the concentration of various molecules making up DSD gates.

A compiler converts the design of a trained neural network into a specific representation using DSD gates. The compiler is analogous to a conventional software compiler except, instead of transforming computer code written in one programming language into another programming language, this compiler transforms the specifications for a neural network into a collection of DSD gates. The DNA strands that make up the DSD gates generated by the compiler are be synthesized. This produces the actual molecules that implement the neural network. Once synthesized, the DNA strands may be mixed together in a single container to form a "one-pot" system or the totality of the DNA strands that make up the neural network may be spatially separated across one or more physical locations and signals they removed between the physical locations such as by use of microfluidics.

Once the neural network is created by combining the DSD gates, the neural network is exposed to signals in the form of ssDNA strands. The neural network then proceeds to classify those signals and generate an output.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. The term "techniques," for instance, may refer to system(s) and/or method(s) as permitted by the context described above and throughout the document. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
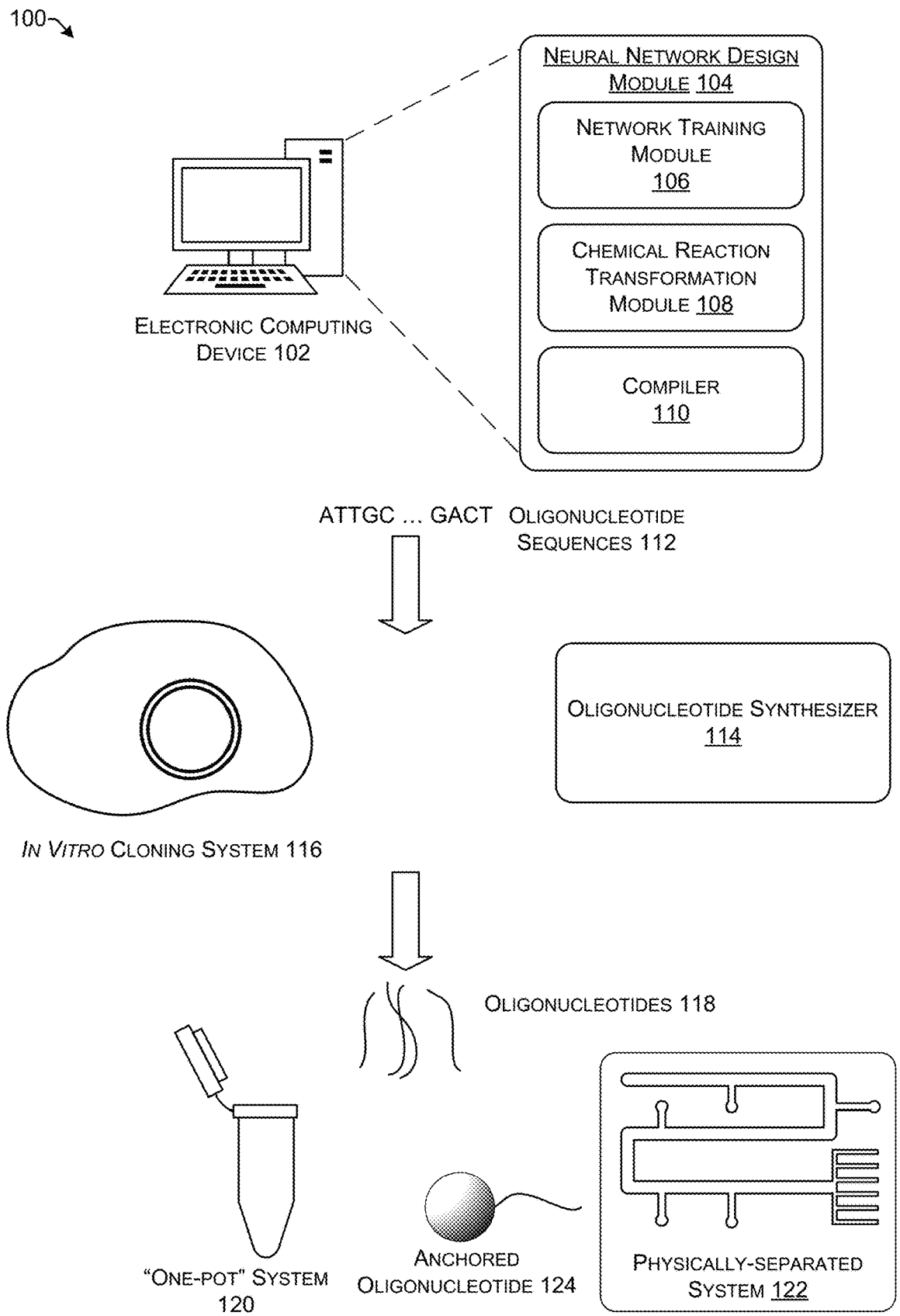
FIG. 1 is a diagram illustrating an architecture for designing neural networks and implementing the neural networks with oligonucleotides.

Neural networks, whether implemented with conventional computers or DNA, include common features. The component units of neural networks are neurons which are also referred to as nodes. A neuron receives one or more inputs and combines those inputs according to an activation function, also called a transfer function, as modified by a bias to produce an output. Each of the inputs has an associated weight. Activation functions typically have the characteristics of being non-linear and differentiable function. Nonlinear activation functions allow neural networks to compute nontrivial problems using only a small number of nodes. Activation functions usually have a sigmoid shape but may also take the form of other non-linear functions, piecewise linear functions, or step functions. Examples of activation functions used in neurons of neural networks include, but are not limited to, binary step, tan h, arctan, hard tan h, sigmoid, bipolar sigmoid, rectified linear unit, and logit.

The neurons of a neural network interconnect forming a network. The output from one neuron may be the input to one or more other neurons. Neurons are also arranged in layers. All neurons in a layer generally share the same activation function. The layer that receives data input from outside the neural network is the input layer. The final layer in which the outputs of the neurons are not passed to other neurons is called the output layer. Activation, or not, of the individual neurons in the output layer communicates the result of the neural network. Layers in between the input layer and the output layer are called hidden layers. Neurons in one of the hidden layers receive inputs from one or more nodes in a previous layer and pass their output to one or more nodes in a subsequent layer. A neural network with more than two hidden layers is referred to as a "deep" neural network.

Neural networks are trained to improve accuracy. Prior to training, a neural network is likely very poor at classification or clustering. Training establishes the weights and biases for neurons of a neural network. The training process for neural networks, or optimization, is generally separated into four steps: forward propagation, error calculation, backward propagation, and weight update. During forward propagation a known input is provided, and the neural network returns an output using the current weights and biases of the neurons. The weights usually start at random values and the bias values may start at zero. The initial results provided by the neural network are likely to be very wrong.

Differences between the output provided by the neural network and the true values for the known input are calculated with a loss function. Thus, error is calculated as the difference between the actual output and the correct output. Different loss functions will give different errors for the same output, and thus, affect performance of the neural network. One common loss function is mean square error which is a type of regressive loss function. Other types of loss functions include classification loss functions and embedding loss functions.

The error, or loss, is pushed backward through the neural network with the process of backward propagation of errors or "backpropagation." Backpropagation identifies which weights contributed most to the loss and finds ways to update the weights so that the loss decreases. The amount and direction of updating a weigh is determined by an optimization function. Gradient descent, stochastic gradient descent, adagrad, and Adaptive Moment Estimation are optimization functions that may be used in the training of a neural network. Backpropagation calculates the gradient of the loss function to determine in which direction the value of a weight should be changed to reduce the error. The weights are updated in a direction indicated by the gradient of the loss function and changed to an extent indicated by a learning rate. The learning rate is a measure of the size of the change in the weights at each training cycle.

One specific type of neural network is a binary neural network (BNN). BNNs have binary weights and activation functions. "Binary" refers to a numbering scheme or a condition in which there are only two possible states. A binary digit or "bit" as used in computer science may take the value of 1 or 0. A light switch may have the binary states of on or off. For neural networks, the two binary states are frequently represented as −1 or +1. However, any nomenclature may be used to represent two binary states a particular choice of nomenclature or representation for binary conditions is not limiting. For example, a BNN represented with the values −1 and +1 can also be represented with the value 0 and 1 or the colors white and black with no change in meaning or to the function of the BNN.

An "analog" neural network is binarized by constraining values to either −1 or +1. For example, all negative weights may be constrained to −1 and all non-negative weights may be mapped to +1. This relative simplicity makes the training of BNNs much less computationally expensive than the training of a similar analog neural network. A neural network may be partially binary. For example, the input layer, the output layer, or another layer may retain analog weights while remaining layers are binary.

BNNs may be trained using full-precision weights for backpropagation and gradient calculation. Activation functions that create binary results may be functions that cannot be differentiated, and thus, cannot be used to calculate a gradient. Therefore, the full-precision weights may be used for backpropagation. One technique for training BNNs that employs gradient estimation techniques is described in Itay Hubara et al., *Binarized Neural Networks*, Advances in Neural Information Processing Systems 29, ed. D. D. Lee 4107 (2016).

Turning now to molecular computing, unlike electronic computing where signals are carried on separate wires and isolated from other signals, the molecules in a molecular computer generally are floating around in solution and bumping together randomly. Instead of using electric current as inputs and outputs, molecular computers use the concentrations of specific chemical species as signals. Additionally, many reactions between molecules do not proceed to 100% completion but may produce less output than the maximum potential output and leave some of the starting reactants remaining in solution. Therefore, techniques for managing noise and signal loss are important for molecular computing.

For DSD circuits, strand displacement occurs when a first ssDNA strand replaces a second ssDNA strand in a dsDNA molecule. The first ssDNA strand typically has a higher affinity for the complementary strand of the dsDNA molecule than second ssDNA strand that is displayed. Higher affinity is generally caused by length—a longer ssDNA strand will hybridize more readily than a shorter ssDNA strand. The cytosine-guanine (C-G) content of a sequence may also affect stability.

Cascades of strand displacement reactions can be used for computational purposes. An individual DSD reaction involves revealing a new sequence in response to the presence of a ssDNA initiator strand. Many such reactions can be linked into a cascade where the newly revealed output sequence of one reaction can initiate another DSD reaction elsewhere. This in turn allows for the construction of chemical reaction networks with many components, exhibiting complex computational and information processing abilities.

These cascades are made energetically favorable through the formation of new dsDNA structures and the entropy gain from dissociation of other dsDNA strands. Strand displacement cascades allow isothermal operation of the assembly or computational process, in contrast to traditional nucleic acid assembly that uses a thermal annealing step in which the temperature is raised and then slowly lowered to ensure proper formation of the desired structure. DSD reactions may also use the initiator species as a catalyst so that availability of the initiator, even at a low level, can cause the reaction to proceed to completion.

Strand displacement complexes can be used to make molecular logic gates capable of complex computation. In the case of DSD circuits, the signal is the presence of ssDNA strands that are released or consumed by binding and unbinding events with other displacement complexes. For example, an AND gate produces an output signal when two input signals are both present. One implementation comprises three parts, two shorter strands bound to a longer strand. A first oligonucleotide input removes one of the short strands through toehold displacement. A toehold, or toehold domain, is a sequence of nucleotides dangling off the longer strand of two bound, oligonucleotides that are not hybridized along their full length. If an incoming oligonucleotide has the right sequence to bind with the longer partner, including the extra dangling 'toehold,' it can rapidly displace the shorter partner. These and other aspects of DNA computing are discussed in Richard A. Muscat et al., *DNA-based Molecular Architecture with Spatially Localized Components, in* The $40^{th}$ International Symposium on Computer Architecture (2013).

"Oligonucleotides" as used herein refers to both DNA, ribonucleic acid (RNA), hybrid DNA-RNA molecules, and DNA or RNA that includes unnatural bases. Reference to DNA in this disclosure is illustrative and not intended to limit the application to only DNA or to only use of natural nucleotide bases. DSD circuits and other portions of a neural network may be implemented with any type of oligonucleotide.

FIG. 1 shows an architecture 100 for creating neural networks using DSD circuits. An electronic computing device 102 which may be any type of conventional computer that uses electronic signals to carry information contains a neural network design module 104. The neural network design module 104 includes modules for designing and training neural networks that are created with DSD circuits. These modules include, but are not limited to, a network training module 106, a chemical reaction transformation module 108, and a compiler 110. Components of the neural network design module 104 may all be located on the same electronic device 102 or they may be spread across different devices located at different physical locations such as, for example, in a network or "cloud" implementation. The neural network design module 104 and components of this module may be implemented using software, firmware, hardware, or a combination thereof. For example, the network training module 106 may be implemented in part by use of a graphics processing unit that is specifically configured at the hardware level for training of neural networks.

The network training module 106 implements components to train a neural network. There are many techniques and tools known to those of skill in the art for training neural networks. One such tool is PyTorch which is an open source machine learning library for Python that provides tensor computation with GPU acceleration and automatic differentiation. Specifications for the neural network to be trained provided by a user. For example, the user may indicate to the neural network design module 104 characteristics of the neural network that is to be created such as a number of layers, the types of layers, a number of neurons, activation functions, etc. The network training module 106 uses design tools to automate the creation of neural-network classifiers implemented with DSD circuits without the need for a technique for manually selecting weights or bias values.

Training the neural network includes repeatedly modifying weights of the neurons in the neural network in a way that improves the accuracy of the neural network. In an implementation, the network training module 106 may use stochastic gradient descent as a loss function for training the neural network. Gradient descent is a first-order iterative optimization algorithm for finding the minimum of a function. To find a local minimum of a function using gradient descent, one takes steps proportional to the negative of the gradient of the function at the current point. SGD is an iterative method for optimizing a differentiable objective function, a stochastic approximation of gradient descent optimization. SGD is a stochastic technique because samples are selected randomly instead of as a single group or in the order they appear in a training set. Gradient estimation techniques may be applied when determining the gradient descent for BNNs. The loss function used for training the neural network may be modified to include an extra term that serves to minimize the number of neurons with poorly formed inputs.

The chemical reaction transformation module 108 takes as input the weights of each layer of the neural network and outputs an object containing the chemical reactions and ordinary differential equations. Thus, the chemical reaction transformation module 108 provides a fine-grained chemical reaction network that may be used to simulate how molecular components of the DSD circuits and of the neural network interact. A CRN comprises a set of reactants, a set of products, and a set of reactions. The chemical reaction transformation module 108 implements several classes, each class containing the specification of a specific DSD circuit design. The DSD circuit designs may be provided in advance by the user or selected from a library of previously-created DSD circuits. The chemical reaction transformation module 108 also allows ODE simulation of the CRN using standard libraries of ODE's. A user may modify aspects of the neural network design based on results of the simulations. The neural network may be simulated under multiple different conditions with the chemical reaction transformation module 108 to identify neural network designs that are likely to yield accurate results in response to many different types of inputs.

The compiler 110 converts a higher-level representation of the neural network into intermediate level representation such as a CRN or a detailed representation such as sequences of specific oligonucleotides used for the DSD circuits. Thus, the compiler 110 is similar to conventional software compilers that transform computer code written in one language into another programming language. One "higher-level" language that may be used by the compiler 110 for a user to design DNA circuits is called DNA strand displacement language. DSD is described in Matthew R. Lakin et al., *Abstractions for DNA Circuit Design*, 9, J. R. Soc. Interface 470 (2011). Visual DSD is an implementation of DSD that uses a web-based graphical interface for design and analysis of DNA strand displacement systems. Visual DSD is described in Matthew R. Lakin et al., *Visual DSD: a design and analysis tool for DNA strand displacement systems*, 27(22) Bioinformatics 3211 (2011). The compiler 110 ultimately generates multiple oligonucleotide sequences 112 representing the specific nucleotide bases.

For implementations of a neural network that place the DSD circuits in more than one physical location, the compiler 110 may also group the oligonucleotide sequences 112 according to physical location. For example, if the DSD circuits that make up a neural network are split across two or more different physical locations, the compiler 110 may identify which oligonucleotides sequences 118 are to be placed in the same physical location in which to place in different physical locations. Splitting the molecular implementation of the neural network across multiple physical locations can prevent crosstalk or other types of unwanted interactions by physically separating DSD circuits and the corresponding oligonucleotides sequences so that oligonucleotides that would interact in an unwanted manner are not able to physically contact each other.

Once the sequences of the oligonucleotides that are needed for implementing the neural network are known, those oligonucleotides are synthesized using any suitable technique for generating oligonucleotides with a specified sequence. An oligonucleotide synthesizer 114 may be used to create oligonucleotides with arbitrary sequences by assembling nucleoside phosphoramidites in a 3' to 5' direction. The oligonucleotide synthesizer 114 may be communicatively connected to the electronic computing device 102 so that the oligonucleotide sequences 112 are passed directly to the oligonucleotide synthesizer 114. Oligonucleotides may also be synthesized by use of an in vitro cloning system 116 that uses engineered plasmids within bacteria to produce ssDNA with arbitrary sequences.

The synthesized oligonucleotides 118 are combined either in a single chamber in a "one-pot" system 120 or in a physically-separated system 122 with two or more separate locations. An Eppendorf tube, test tube, spectrophotometer cuvette, or any other container suitable for holding the oligonucleotides 118 may be used for the one-pot system 120. In order for the oligonucleotides 118 to move and interact with each other to perform the computations of the neural network, the one-pot system 120 also includes an aqueous solution that may be buffered to maintain pH, salt levels and other conditions within a range that is suitable for oligonucleotide hybridization and disassociation. One suitable buffer solution is 1× TE buffer with 12.5 mM $Mg^{2+}$.

The concentrations of the oligonucleotides 118 corresponding to the various DSD circuits in the neural network may be varied based on the weights determined by the network training module 106. For example, a neuron that is given a higher weight may have the corresponding DSD circuits present at a higher concentration neuron that is assigned a lower weight. The concentration of DSD circuits may be proportional to the respective weights such that a first DSD circuit that is weighted twice as heavily as a second DSD circuit may have double the concentration. Concentration of the oligonucleotides 118 forming the DSD circuits may be on the order of micromoles such as about 1-100 μM.

If the neural network is implemented as a BNN, weights for the neurons may be implemented by the structure of the DSD circuits rather than the concentration. DSD circuits that output the same binary value as input implemented the weight of +1 which DSD circuits that have a weight of −1 switch the binary value of the input. Because concentrations of oligonucleotides 118 are not used to implement the weights of a BNN, some or all of the DSD circuits may be implemented with the same concentration of oligonucleotides 118. There may also be a standard concentration of oligonucleotides 118 that in increased or decreased based on the role a particular oligonucleotide 118 has in a DSD circuit. For example, some oligonucleotides may be needed at the concentration of 2× while others are present at the concentration of 1× and yet other oligonucleotides with different functions are present at the concentration of 0.5× where × is a standard concentration that is uniform throughout the system.

The physically-separated system 122 may use manual pipetting, laboratory robotics, microfluidics, surface acoustic waves, or any other technique for moving oligonucleotides and small volumes of liquid between separate physical locations. In a physically unified system, such as the one-pot system 120, every oligonucleotide is able to interact and potentially hybridize with all the other oligonucleotides.

This may lead to unexpected and undesired interactions if, for example, two single-stranded oligonucleotides that are not intended to interact are similar enough to each other that they hybridize. This could cause noise that interferes with the intended signal and reduces the accuracy of the neural network. By separating the neural network into multiple different physical locations, the number of oligonucleotides present at any one of the physical locations is reduced and the potential for interference or undesired hybridization is also reduced. Separating the neural network across different physical locations can also simplify the production and design of the new network because a smaller number of unique oligonucleotide sequences are needed due to the ability to use the same sequence in different physical locations.

The results of reactions at one of the separate physical locations are moved to a different physical location in order to continue the processing of the neural network. After the reactions at one physical location are given time to proceed to completion, the output of those reactions may be moved to another physical location where they function as an input. The separate physical locations may correspond to the structure of the neural network. For example, each layer or neuron of the neural network may be implemented at a separate physical location.

The DSD circuits at the specific, discrete physical locations may be mixed at specified times based on the reaction speed of the DSD circuits. Thus, after all the DSD circuits in a first layer of the neural network have reacted, that first layer may be combined with a second layer of the neural network. Movement of the DSD circuits may be performed in a programmatic and automatic way by control systems that operate microfluidic devices or other equipment for moving volumes of liquid. The timing and specific movements of the DSD circuits in a physically-separated system 122 may be generated by the compiler 110 and provided to a microprocessor or other type of the control system for managing movement of the DSD circuits from one physical location to another. In addition to moving oligonucleotides 118 within the physically-separated system 122, additional oligonucleotides may be added to the physically-separated system 122 during the processing of the neural network.

Movement of all the material from a first physical location to a second physical location may transfer DSD circuits, oligonucleotides, and other carryover material that is not needed for further operations of the neural network. In order to allow selective transfer of some but not all of the oligonucleotides from a first physical location to a second physical location, there may be an anchored oligonucleotide 124 that is attached to a substrate such as a DNA chip or a bead. The anchored oligonucleotide 124 may be attached to the substrate using any type of linker or established technique for affixing oligonucleotide to a surface through formation of covalent bonds, electrostatic attraction, or another mechanism.

During processing with the physically-separated system 122, the anchored oligonucleotide 124 may be either an oligonucleotide that is passed to the next physical location or an oligonucleotide that is retained. For example, oligonucleotides that form part of a DSD circuit may be attached to a substrate that remains at the location which the DSD circuit operates. After reacting to any input, the output oligonucleotide which is not bound to the substrate and is moved to the next physical location without transferring the DSD circuits attached to the substrate. As an alternative example, oligonucleotides representing outputs from a neuron may be attached to a bead that is moved to a subsequent physical location within the physically-separated system 122. For example, the contents of a first physical location may be washed removing all oligonucleotides that are not attached to the beads so that only the beads and the attached output oligonucleotides are transferred to a second physical location. The beads may be magnetized, coated with streptavidin, or have other characteristics that allow for selective manipulation of the beads.

Using a physically-separated system 122 allows for reusing certain DSD circuits and oligonucleotide sequences. In a one-pot system 120 crosstalk is controlled by having globally unique sequences whereas in the physically-separated system 122 crosstalk may also be controlled by physical separation. If a neural network is implemented in a one-pot system 120, all DSD circuits having the same oligonucleotides sequence will react in the same way. But by separating the system into multiple different physical locations, it is possible to place the same DSD circuits at different locations and have those DSD circuits perform different functions at the respective locations. Thus, one feature of a physically-separated system 122 is that it may operate with fewer unique oligonucleotides than a one-pot system 120.

Figure 2:
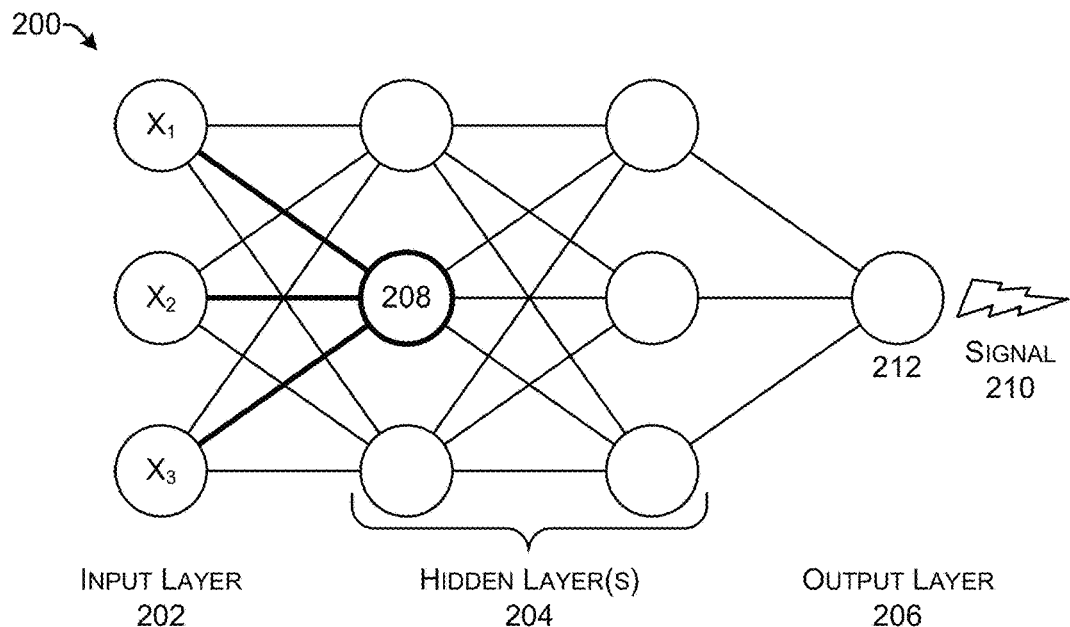
FIG. 2 is a schematic diagram showing the structure of an illustrative neural network.

FIG. 2 shows an illustrative neural network 200. The neural network 200 includes an input layer with three neurons, two hidden layers 204 each with three neurons, and an output layer 206 with one neuron. The neural network 200 is an abstraction of sets of DSD circuits. Thus, each neuron in the neural network 200, such as neuron 208, represents one or more DSD circuits. In this example, the neural network 200 is a fully-connected network but it may also be implemented as a sparsely-connected network or a convolutional neural network. The neural network 200 may also be implemented as a fully or partially BNN.

In an implementation, each neuron in the neural network 200 may perform a weighted summation of inputs to determine an output. For example, neuron 208 may perform a weighted summation of inputs $X_1$, $X_2$, and $X_3$ to determine the output to provide to the neurons of the second hidden layer. If the neural network 200 is a BNN, and the values of the inputs are $X_1=+1$, $X_2=+1$, and $X_3=-1$, then the sum is +1. If the weight of neuron 208 is +1 then its output is also +1. If the weight of neuron 208 is -1, then the value of the output is switched and the summed value of +1 becomes -1 for the output.

The signal 210 is generated by the neuron 212 of the output layer 206 upon activation. The signal 210 is any detectable result from activation of the neuron 212. Here, only one signal 210 is shown but in an output layer 206 with multiple neurons, there would be multiple signals. Each signal 210 in a neural network 200 that generated multiple signals will be distinguishable from the other signals by type of signal or by location.

The signal 210 may be, for example, a ssDNA strand output from a DSD circuit in the neuron 212. The ssDNA strand is read by sequencing such as, but not limited to, by nanopore sequencing that is capable of rapidly sequencing a single DNA molecule with the need for polymerase chain reaction amplification. The identity of the DNA molecule, its sequence, provides the information that the neuron 212 was activated. In one implementation, the entire contents of the location holding the output layer 206 may be sequenced and the sequence output searched from the known sequence generated as the output of neuron 212.

Another suitable type of signal 210 is fluorescence. A fluorescence probe and quencher may be attached to separate strands of a dsDNA molecule in a DSD circuit such that the quencher absorbs fluorescence of the probe until the DSD circuit is activated. The output of the DSD circuit, which is also the output of neuron 212, may be either a ssDNA strand with the fluorescence probe or the quench. Once physically separated from the quencher, the fluorescence probe emits a fluorescence as signal 210 when excited by light of the appropriate wavelength. Examples of fluorescent dyes that may be used include the Atto dyes available from Millipore Sigma®.

The signal 210 may also be associated with a biological behavior when the neural network 200 is implemented in a biological system such as inside a cell. For example, the signal 210 may be an RNA molecule that is translated by the cell into a protein which can affect the behavior of the cell such as causing cell death in a cell that is identified as diseased. Additionally or alternatively, the oligonucleotide released as the signal 210 may cause a structural response such as altering the structure of a DNA origami complex. Altering the structure of the DNA origami complex could, for example, release a drug contained inside a cage of DNA.

Figure 3:
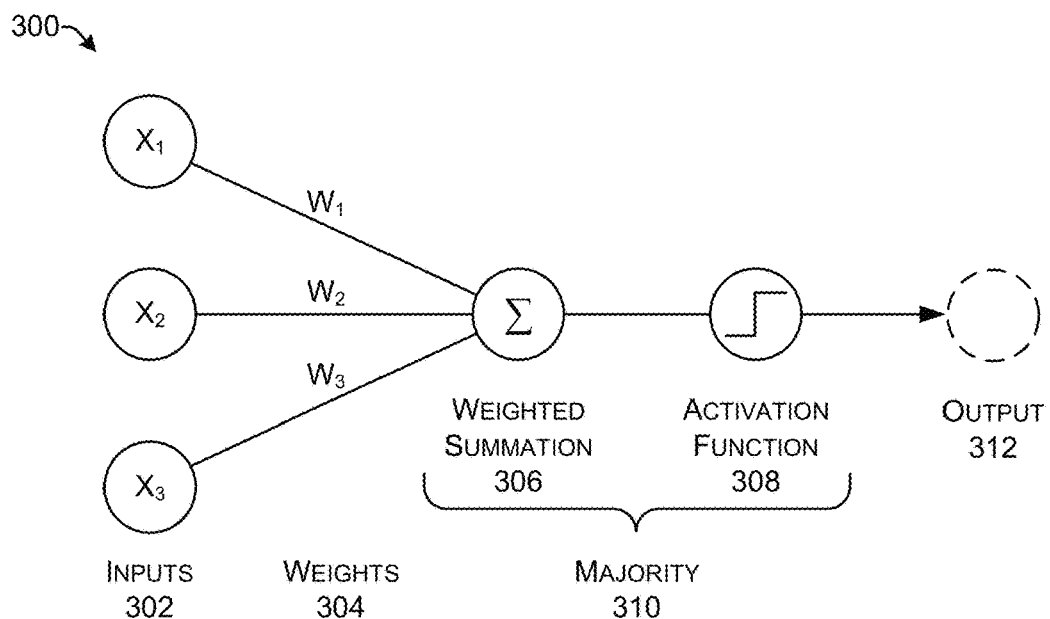
FIG. 3 is a schematic diagram of an illustrative neuron from the neural network of FIG. 2.

FIG. 3 shows an illustrative neuron 300 of a neural network such as, for example, the neuron 208 of the neural network 200 shown in FIG. 2. The neuron 300 receives a set of inputs 302 and corresponding weights 304. The neuron 300 may perform a weighted summation 306 of inputs. For example, neuron 300 may perform a weighted summation 306 of inputs $X_1$, $X_2$, and $X_3$ that is provided to an activation function 308. The activation function 308 may be, but is not limited to, any of the activation functions described above.

If the neural network 200 is a BNN, the values of the inputs 302, the weights 304, and the activation function 308 are each a binary value. Thus, using +1 and −1 as the two binary values, the weights 304 are each +1 or −1. A weight 304 of +1 maintains the value of the input 302, but a weight 304 of −1 flips the value of the input 302. The weighted summation 306 sums the +1s and −1s coming from the inputs 302. For BNNs, each neuron may be designed on the neural network design module 104 so that it has an odd number of inputs 302 to avoid the situation where an equal number of +1 and −1 inputs 302 sums to zero. The activation function 308 then maintains the result of the summation if the weight of the activation function 308 is +1 and flips the value of the summation if the weight of the activation function 308 is −1. The combination of the weighted summation 306 and the activation function 308 in BNNs effectively identifies the majority 310 input of the binary values of the inputs 302. This is because if the majority of the inputs 302 are +1 the weighted summation 306 will yield a positive value which will be processed by the activation function 308 to generate a +1 output 312. Only the sign not the magnitude of the value produced by the weighted summation 306 affects the output 312 of the activation function 308 in this implementation.

The output 312 of the neuron 300 is passed to connected neurons in the subsequent layer or triggers a signal 210 if the neuron 300 is in the output layer 206. Neuron 208, for example, passes the output 312 to all the neurons in the next one of the hidden layers 204. Identifying the majority 310 from the inputs 302 and the weights 304 even in a binary neuron may involve comparing the concentrations of the oligonucleotides that are the inputs 302. Because the concentrations of specific molecules are a factor in determining the output 312 of the neuron 300, this type of neuron structure may be referred to as an analog binary-neuron.

Figure 4:
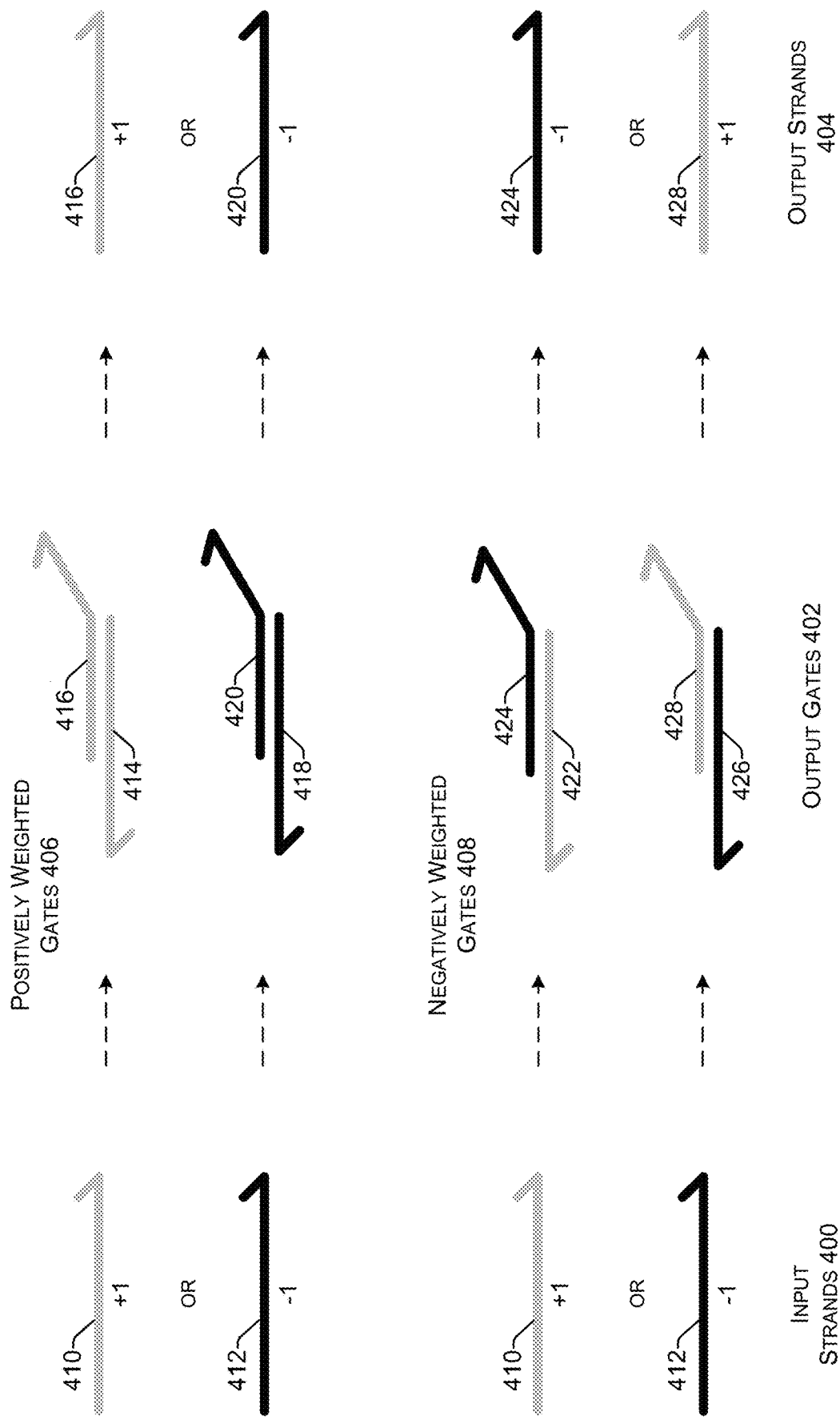
FIG. 4 is a representation of positively and negatively weighted DSD gates configured in a dual-rail implementation.
Figure 5:
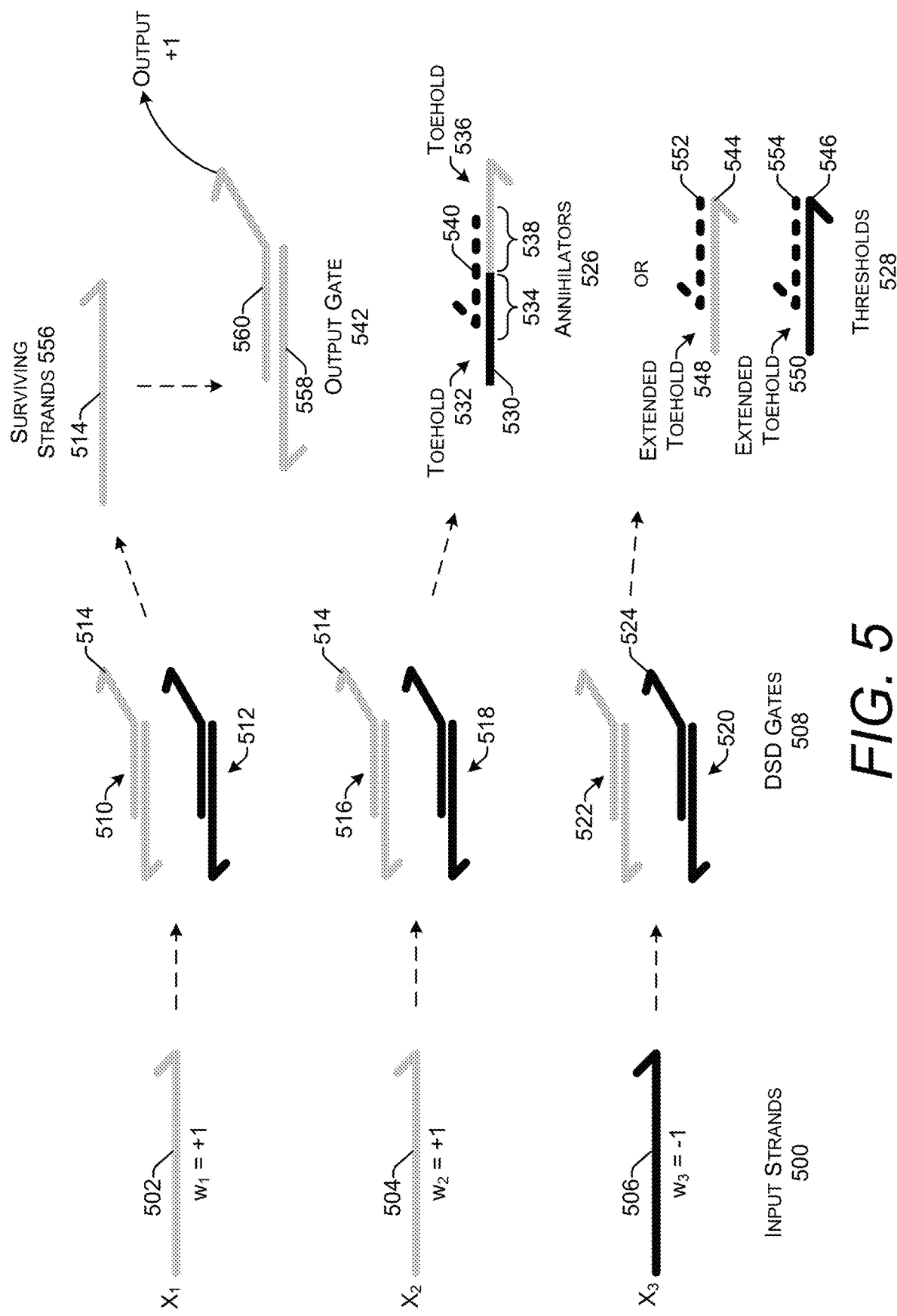
FIG. 5 is a representation of three DSD gates responding to inputs and generating a single output based on the most numerous input.

FIG. 4 shows transmissions of signals using ssDNA strands through DSD circuits. The components of the DSD circuits are represented at the domain level in which the arrowheads represent the 3'-ends of the strands. The DSD circuits may be implemented using seesaw gates, two-domain transducer gates, or another type of DSD gate. Specific oligonucleotides sequences of any portion of the domains represented in FIG. 4 or FIG. 5 are not specified at this level of generality and will be determined in practice by the compiler 110. A basic DSD circuit includes an input strand 400, output gates 402 and an output strand 404 which displaced from one of the output gates 402. The output gates 402 can be constructed as positively weighted gates 406 or negatively weighted gates 408. The weighted summation 306 and the activation function 308 shown in FIG. 3 may comprise multiple basic DSD circuits such as those shown in FIG. 4.

For positively weighted gates 406, the output strand 404 has the same sign as the input strand 400. The input strand 400 is one of two binary values represented here as +1 or −1. Using dual-rail logic, a first ssDNA strand 410 represents an input value of +1 and a second ssDNA strand 412 represents an input value of −1. Depending on which of the two strands 410 or 412 is received, one of the positively weighted gates 406 will have a toehold that is able to hybridize with input strand 410 or input strand 412. The input strand 410 partially hybridizes with strand 414 at the toehold and displaces strand 416 through branch migration. Strand 416 becomes the output strand 404. Similarly, if the input strand 400 is strand 412, representing the binary value of −1, strand 412 partially hybridizes with strand 418 and displaces strand 420. Strand 420 is thus the output strand 404 from the positively weighted gates 406 in response to the input of strand 412. Thus, with positively weighted gates 406, if the input strand 400 represents the binary value of +1 the output strand 404 will also represent the binary value of +1. Conversely, if the input strand 400 represents the binary value of −1 output strand 404 will also represent the binary value of −1.

Negatively weighted gates 408 function the same as the positively weighted gates 406; however, an input strand 400 representing +1 yields an output strand 404 representing −1 and an input strand 400 representing −1 yields an output strand 404 representing +1. Thus, strand 410 hybridizes with complementary strand 422 and displaces output strand 424. But unlike with the positively weighted gates 406, the output strand 424 is assigned a binary value of −1. If the input strand 400 is strand 412 with the binary value of −1, it will hybridize to a toehold on strand 426 and display strand 428 which is associated with the binary value of +1.

The DSD circuits shown in FIG. 4 and described elsewhere in this disclosure may be implemented with or without catalytic fuel strands. Catalytic fuel strands trigger the output of a DSD gate in the presence of an input strand 400. Thus, allowing a single input strand 400 to be reused and to trigger multiple DSD gates. However, for BNNs, the concentration of the input strand 400 does not affect the correctness of the calculation. It does, however, affect the total reaction time of a neuron. The larger the remaining concentration of input strands 400, the more input strands 400 are left in solution to help catalyze the output gates 402 and the faster the output strands 404 are released. An increase in the concentration of input strands 400 decreases the total reaction time. Thus, the use of DSD gates that incorporate fuel strands may reduce the total reaction time of a neural network. So that a small number of input strands 400.

However, even without fuel strands, DSD circuits may be designed to release all of the output strands 404 by providing a concentration of inputs strands 400 that is sufficient to trigger all of the corresponding output gates 402.

FIG. 5 shows an illustrative set of DSD circuits implementing majority voting. FIG. 5 continues with the example of three input strands 500. However, a greater or lesser number of input strands 500 may be used. The DNA displacement reaction shown in FIG. 5 may represent reaction performed to implement neuron 208 of FIG. 2 or neuron 300 FIG. 3.

Input strands 500 include the first input strand 502 representing the value $X_1$, a second input strand 504 representing the value $X_2$, and a third input strand 506 representing the value $X_3$. In a binary implementation, the weight for each of the input strands 500 is either +1 or −1. In this example, the first two input strands 502 and 504 have a weight of +1 and the third input strand 506 has a weight of −1. By keeping the total number of input strands 500 an odd number, the possibility of having the same number of positively weighted input strands and negatively weighted input strands is avoided. Each of the input strands 502, 504, and 506 interacts with the respective pair of DSD gates 508 in a dual-rail configuration.

The first input strand 502 interacts with the DSD gate 510 but does not interact with DSD gate 512 which is configured to hybridize with input strand 500 having a binary value of −1. The first input strand 502 displaces ssDNA strand 514. The second input strand 504 is available to interact with one of DSD gates 516 and 518. Because the second input strand 502 represents the binary value of +1 interacts with the DSD gate configured to hybridize with positive input signals which is DSD gate 516. This in turn displaces ssDNA strand 514 which is the same strand displaced by the DSD gate 510. The third input strand 506 has a binary value of −1 so it interacts with the DSD gate 520 and not with that DSD gate 522 that response to input strands 500 having the binary value of +1. The third input strand 506 displaces ssDNA strand 524.

Thus, in this simple example the DSD gates 508 have responded to the three input strands 502, 504, and 506 by releasing two strands that correspond to the binary value of +1 and one strand that corresponds to the binary value of −1. Of course, in an actual implementation with DNA molecules in solution will be more than just one strand in the amount of each type of DNA molecule in solution will likely be measured in terms of concentration such as nanomoles or picomoles. Thus, following the disassociation of the DSD gates 508, the concentration of strand 514 will be approximately twice that of strand 524. Although all the DSD gates 508 shown in FIG. 5 are positively weighted, any or all of these DSD gates 508 may be implemented as negatively weighted DSD gates such as negatively weighted gates 408 shown in FIG. 4.

Majority voting is implemented by consuming all the strands of the minority species. In this example, the minority species is strand 524. Of course, the minority species is not known in advance and will change depending on the inputs received by the neural network. Thus, either annihilators 526 or thresholds 528 are used to consume the strands, 514 or 524, that are present at the lowest concentration.

Annihilators 526 include a first strand 530 that has both a first toehold 532 and a first complementary region 534 which hybridize with the strand 524 representing the binary value −1 and a second toehold 536 and second complementary region 538 that hybridize with the strand 514 representing the binary value +1. A second strand 540 hybridizes with the first strand 530 to create a double-stranded region that is present before the annihilators 526 react with either of the strands they are configured to consume. Annihilators 526 can thus hybridize with both the strand 514 representing +1 and the strand 524 representing −1. Annihilators 526 consumes both strands 514 and 524 equally so long as both are present. Whichever strand is most numerous will remain.

Thresholds 528 are associated with one specific strand and consume that strand at a faster rate than the strand reacts with an output gate 542. Thresholds 528 are similar to DSD gates but include a longer strand 544, 546 with an extended toehold 548, 550 on one side and no toehold on the other side. Consequently, the "top" strand 552, 554 has no toehold and is therefore inert when released. The extended toehold 548, 550 is longer by a few nucleotides to provide faster reaction rates than a DSD gate. Thresholding is an essentially irreversible reaction because of the favorable free energy change resulting from the longer hybridized region. Thus, so long as thresholds 528 are present, strand 514 will be fully consumed through hybridization with strand 544 and strand 524 will be fully consumed by hybridization with strand 546.

The concentration of the respective thresholds 528 added to solution in which the neural network is implemented the may be based on the number of inputs. Assuming an odd number of inputs, the concentration multiplier for each of the thresholds 528 may be the total number of inputs minus one and divided by two. In this example, the total number of inputs is three and so the concentration multiplier of each type of threshold 528 would be/2=1. Thus, there will be sufficient thresholds 528 to consume all the output from one DSD gate 508 generating positively valued strands such as strand 514 and there will be sufficient thresholds 528 to consume all the output from another DSD gate 508 generating negatively valued strands such as strand 524. Therefore, the surviving strands 556 are the output of the remaining DSD gate 508. In this example, strand 514 is the strand that remains after thresholding or annihilation. This is the displacement strand that is the most numerous from all of the DSD circuits 508. Identifying the surviving strands 556 following the use of annihilators 526 or thresholds 528 implements the weighted summation 306 shown in FIG. 3. By designing the DSD circuit so that there is a guarantee of a minimum concentration of input strands 500 remaining after annihilation or thresholding, DSD circuits that do not use fuel strands will generate sufficient numbers of surviving strands 556 to fully react with the output gate 542.

The annihilators 526 and thresholds 528 may take time to react and fully consume DNA strands. Thus, the neural network may be implemented with a temporal delay following addition of the annihilators 526 or thresholds 528. The time delay may be implemented by waiting to add the annihilators 526 or the thresholds 528 to the solution containing the DSD circuits of the neural network. The time delay may be implanted by moving the solution containing the signals to a new location where the next series of DSD circuits are available only after waiting a set amount of time. The annihilators 526 and the thresholds 528 will also absorb "noise" that may exist due to the presence of undesired ssDNA strands as a result of leakage or other aspect of the chemical nature of the system. As described above, some ssDNA strands that are the intended output signal will also be consumed by the annihilators 526 or the thresholds 528, but if the signal is sufficiently strong signal strands will remain.

The surviving strands 556, whether identified through use of annihilators 526 or thresholds 528, reacts with an output gate 542. The output gate 542 is a DSD gate in which the surviving strands 556 hybridize with a strand 558 of the output gate 542 displacing an output strand 560. The output strand 560 is a single-stranded output oligonucleotide. Only one output gate 542 is shown in FIG. 5. However, with dual-rail logic there will also be a second output gate to react with strand 524 if it is the majority strand. The output gate 542 is shown here as having a positive weight because an input of +1 leads to an output of +1. Thus, a weight of the activation function 308 for a neuron may be implemented by the design of the output gate 542. However, the output gate 542 may also be implemented with a weight of −1 like the negatively weighted gates 408 shown in FIG. 4. With the gate implementation shown in FIG. 5, the weighted summation 306 and activation function 308 of FIG. 3 may be implemented in a single step by assigning output value based on the most abundant input strand 500.

For a neuron in the output layer of a neural network, the output gate 542 may generate an output of the neural network. One type of output signal is fluorescence generated by exciting fluorophores with a specific wavelength of light. Displacing strand 558 from the output gate may separate a fluorophore on strand 558 from a quencher on strand 566. This ultimately causes the fluorescence that is recognized as output from the output neuron. Different output neurons may be designed with different fluorophores so that each output neuron generates a unique color of fluorescence.

The design of a neural network implemented with DSD circuits as illustrated in FIG. 1-5 results in circuit functionality and robustness to noise as described below. Neuron 208 introduced in FIG. 2 may be represented as neuron j of layer l. Neuron j is configured to receive and interpret input in the form of 2n signal strands which are released by the n neurons of the previous layer. For neural network 200, the previous layer prior to the layer including neuron 208 is the input layer 202. Thus, in this example neural network 200, n=3. Each input feature may be represented in dual-rail form with a positive and negative input strand such as input strands 410 and 412 shown in FIG. 4. Thus, neuron j may potentially receive six different input strands. The two input strands in a dual-rail configuration are mutually exclusive for each input feature. The specific input strands are received by neuron j depends on the outputs of the neurons in layer l−1.

Neuron j is associated with two "container-unique" recognition domains. A container is the environment in which neuron j is able to interact with other oligonucleotides. The container may be an Eppendorf tube, a droplet of water in a microfluidics system, or something else. A container-unique recognition domain is an oligonucleotide sequence, generally a toehold sequence, that is not found on any of the other oligonucleotide sequences in the same container except for those that are intended to interact with neuron J. If the neural network is implemented in a one-pot system, then the container-unique recognition domain is also a globally unique recognition domain.

The two container-unique recognition domains are a positive recognition domain and a negative recognition domain. The n positive input strands are encoded with the positive recognition domain of neuron j and the n negative input strands are encoded with the negative recognition domain. Neuron j has a thresholding component or an annihilator component that is capable of fully consuming either the positive or negative input strand species, whichever had the least concentration. The surviving input strand species can then trigger the output gate of neuron j by binding to its corresponding recognition domain, thus giving a binary output response.

For each output gate that releases an input strand to some successive neuron k of layer l+1, the binary weight between neuron j and k is implemented in the encoding of the output gate of neuron j. If the surviving strand species for neuron j is the +1 species and the weight to neuron k is +1, the output gate that is triggered by the positive recognition domain of neuron j is synthesized to release a positive input strand to neuron k. Thus, the output gate of neuron j is a positively weighted gate such as the positively weighted gates 406 shown in FIG. 4. Similarly, if the −1 species is the most numerous for neuron j, the output gate release a negative input strand to neuron k. However, if the weight between neuron j and k is −1, the polarity of the output gate is reversed. Thus, the output gate is a negatively weighted gate such as the negatively weighted gates 408 shown in FIG. 4. Specifically, the output gate with the positive recognition domain of neuron j is synthesized such that it releases the negative input strand of neuron k and vice versa for the negative recognition domain gate of neuron j.

BNN's may be created with all DSD circuits at the same concentration. This potentially simplifies the creation of the neural network because variations in concentration are not used to implement real-valued weights. Continued with the previous example, assume neuron j has 2m output gates each of concentration k. Neuron 208 that is connected to three other neurons in the next hidden layer will have six output gates. In total, neuron j has to be able to release a total concentration of mk output strands. For neuron 208 this would be a concentration of 3k output strands. Hence, the total concentration of the remaining input strands after thresholding must be at least mk. If the number of input features to neuron j to be odd, and each input feature strand species has a concentration h, then at least a concentration h of the input strands will survive thresholding. If the neuron uses thresholds 528, the concentration of the thresholding gates may be set to h. The per-input concentration h required to trigger all of the output gates can be calculated as h=mk/n. If neuron j is part of the first layer of the network, h is effectively the concentration to needed for each network input strand. If neuron j is part of a hidden or output network layer, h is the concentration to prepare the output gates of the previous layer.

The above recursive concentration formula is a worst-case, lower bound on the concentrations required. For certain input patterns, more than 1 of the n input strand species may survive the thresholding. For example, neuron j may have 10 inputs with seven being positive input strands and three being negative input strands. The difference is four and a concentration of 4h of the positive input strands may survive thresholding. With a greater difference between the number of positive input strands and negative input strands there is a greater tolerance for lower strand concentrations in a corresponding greater resilience to noise. Specifically, if the absolute value of the sum of input features $x_i$ to neuron j is $c_j$, and each input feature species has concentration h, then a concentration ch of input strands will survive thresholding. Hence, the recursive concentration formula becomes $k_{l-1}=mk_j/$. This indicates that greater tolerance for variations in thresholding gate concentrations when the results of the thresholding moves farther away from the decision boundary of the activation function of a neuron.

The decision boundary is the threshold at which the output from neuron j switches between +1 and −1. All positive inputs are evaluated the same and all negative inputs are valuable to the same. Therefore, designing the neural network so that each neuron will have inputs that sum to a value which is as far away from the decision boundary as possible increase the robustness of the neural network and tolerance to noise. This may be thought of as maximizing the absolute value of the sum of the inputs to neuron j.

Even in a BNN there may be analog behavior in that the annihilator component or the threshold component identifies the input present in the greatest concentration. Consider a neuron with 10 inputs four which are +1 and six of which are −1. If, however, the concentrations of each input strand are not equal and the total concentration of the four positive input strands is 5.6× while the concentration of the six negative input strands is only 5.4× this will lead to the incorrect output because +1 was present at the highest concentration even though it accounted for a minority of the number of inputs. This type of error can be minimized by increasing the difference between the number of positive input strands and negative input strands.

Training of the neural network by the network training module 106 may be modified to bias neural network formation in a way that minimizes the occurrences of poorly formed input patterns. A poorly formed input pattern is an input pattern has approximately the same number of positive input strands and negative input strands. One way to do this is by maximizing the coefficient $c_l$. The coefficient $c_l$ can be maximized by appending a Margin Ranking loss function to each neuron, which is minimized using gradient descent during network training. Specifically, for neuron j of layer l, the added loss function $l_{margin}(l, j)$ is: $l_{margin}(l, j)=\max(0, -y_j \times sum_i(x_{i,j})+r)$, where r is a constant, $y_j$ is the output and $x_{i,j}$ is the i:th input.

Coefficient $c_l$ for each layer can be set to the minimum lower confidence bound of $sum_i(x_{i,j})$, where the minimum is taken over neurons in layer l and the confidence interval is calculated across the test set of input patterns. Thus, coefficient $c_l$ may be different for each layer in the neural network. The test set of input patterns may be generated during testing performed with the chemical reaction transformation module 108. Appending this additional loss function to the neural network training can optimize the neural network for implementation with DSD circuits by maximizing the expected distance of the inputs from the decision boundary of each neuron. This distance is proportional to the concentration noise tolerance of a neuron implemented with DSD circuits.

The binarization of inputs, weights and neuron outputs automatically provides robustness to implementation noise. Due to the binary implementation, values that move farther away from the decision boundary do not affect the outcome. For example, if in the absence of noise the surviving input species will be positive, then it does not matter how much additional positive input concentration is present due to noise effects. The inverse is true if the surviving input species is negative in an ideal, noise-free execution. Also, a higher surviving concentration of the input strand the more noise the neuron can tolerate and still perform the correct computation. Thus, if the surviving input concentration, in the absence of noise, is ch>=1 is the input pattern-specific distance from the neuron decision boundary), and h is the surviving concentration needed to release all outputs of the output gate, then the neuron can tolerate a reduction of ch−h in total input concentration and the output gate will still release the full amount of output oligonucleotides. From this it follows that if the concentration of every strand and gate in the system is scaled by a factor d, then the neuron tolerates a reduction of d×in input concentration due to noise.

Illustrative Process

For ease of understanding, the process discussed in this disclosure are delineated as separate operations represented as independent blocks. However, these separately delineated operations should not be construed as necessarily order dependent in their performance. The order in which the process is described is not intended to be construed as a limitation, and unless other otherwise contradicted by context any number of the described process blocks may be combined in any order to implement the process or an alternate process. Moreover, it is also possible that one or more of the provided operations is modified or omitted.

Figure 6:
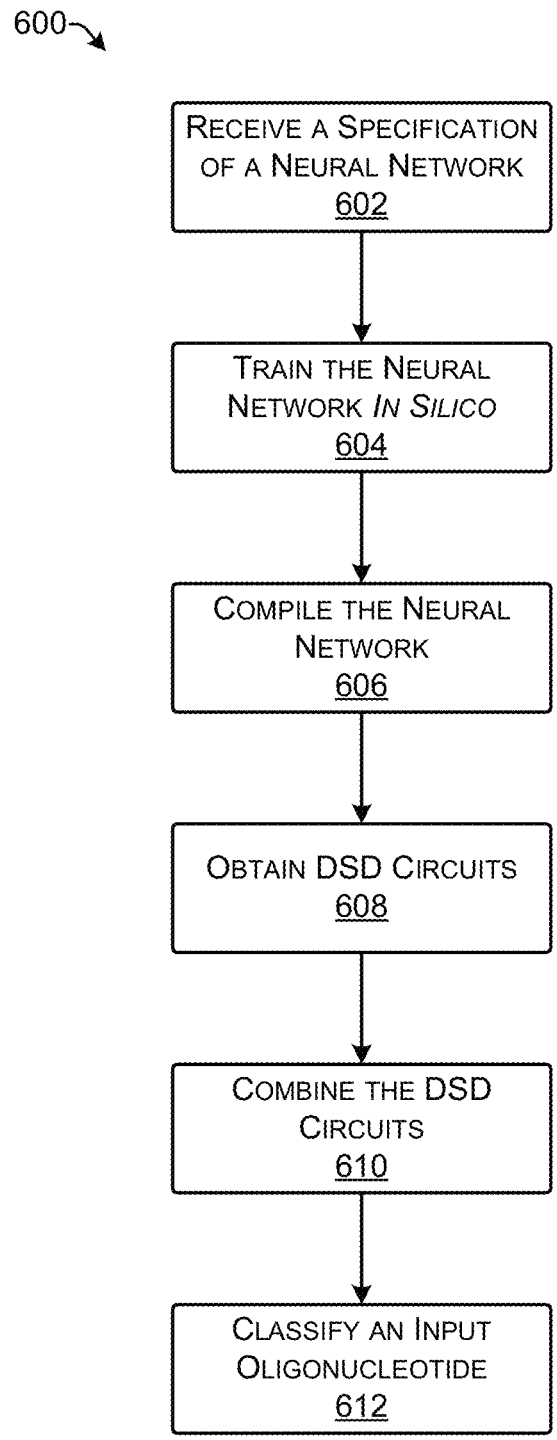
FIG. 6 is a flow diagram showing an illustrative process for implementing a neural network with DSD gates.

FIG. 6 shows process 600 for making a neural network using DSD circuits and classifying an oligonucleotide with the neural network. Process 600 may be implemented using the architecture shown in FIG. 1 and the DSD circuits shown in FIG. 4 and FIG. 5.

At 602, a specification of a neural network is received. The specification of the neural network may be received at an electronic computing device such as the electronic computing device 102 of FIG. 1. At electronic computing device 102, the specifications of the neural network may be provided to the neural network design module 104. The specifications of the neural network may include any aspects of the neural network that is specified for creating neural networks entirely on electronic computing devices. For example, the neural network may be specified in terms of the number of layers, the types of layers, number of nodes in individual layer, a level of interconnection nodes in the various layers, characteristics of inputs, characteristics of outputs, activation functions, and the like. The neural network may also be specified in terms of being a real-valued neural network or a binary neural network. The function to be performed by the neural network may also be specified such as classification or clustering.

Specifications that are specific to neural network implemented with DSD circuits include the oligonucleotide sequences that may function as an input to the neural network. The oligonucleotides sequences may be arbitrary sequences that represent other values which may, for example, be correlated with the specific sequences on a lookup table maintained outside of the neural network. If the neural network is acting on biological oligonucleotides, the specified oligonucleotide sequences of the inputs may be based on biological knowledge of the system being analyzed. For example, the sequences of mRNA molecules corresponding to proteins of interest may be used as the input oligonucleotide sequences. Furthermore, the neural network may be designed to act directly on oligonucleotides that are storing digital data. In this application, the known sequences of specific oligonucleotides in the data store can be used as inputs to the neural network.

An additional specification that is specific to DSD circuits is the type of DSD circuit. The neural network design module 104 may be provided with the type of DSD circuit with which the neural network is intended to be created such as seesaw circuits or two-domain circuits.

At 604, the neural network is trained in silico. Training of the neural network may include training neuron and connection weights as well as biases. The training may be performed by the network training module 106. The training may use any known loss function for training neural networks such as margin ranking loss function or hinge loss. Training of the neural network results in a trained neural network.

The loss function may be modified to also account for the specific behavior of DSD circuits. One modification is to use the loss function to maximize the distance of the combination of inputs for each neuron from the decision boundary of that neuron. Maximizing the distance from the decision boundary increases the neuron's tolerance to noise and decreases the likelihood that the neuron will output an incorrect signal. The distance from the decision boundary for a given neuron depends on the values of the inputs which in turn depend on the inputs initially provided to the neural network. Thus, the design attempts to maximize the probability that there will be a larger rather than a smaller distance between the combined value of the inputs and the decision boundary. In an implementation, the chemical reaction transformation module 108 may be used to test various combination of inputs to the neural network and identify which neural network structure(s) maximize the confidence level that the distance from the decision threshold will be maximized for each neuron in the neural network.

The neural network may be implemented as a BNN in which all the neurons or at least all the neurons in one hidden layer have an activation function that specifies either a positive weight or negative weight and connections to the neurons have either a positive weight or negative weight. As discussed above, a positive weight may be represented by the value +1 and a negative weight may be represented by the value −1. For BNNs the loss function may be a margin ranking loss function in the training of neuron in connection weights in the neural network may use SGD to minimize the derivative of the margin ranking loss function. SGD may be used to minimize the derivative of the margin ranking loss function in such a way that for each neuron absolute value of the weights of the binary inputs is maximized. The value of the weights may be calculated by summing the +1 values for positive inputs and −1 values for negative inputs. Increasing the absolute value of this number increases the neuron's ability to arrive at an accurate output in the presence of noise.

At 606, the neural network is compiled to a specific collection of DSD circuits. The compiler 110 may be used to compile the neural network. The compiler 110 may identify the specific types of DSD circuits and the oligonucleotide sequences of the components of the circuits. For example, compilation may select sequences for the DSD circuits in an input layer of the neural network so that there is a toehold and adjacent complementary region in specific DSD circuits that hybridize with sequences from the input oligonucleotides. The neural network may also be compiled such that at least one neuron uses pairs of DSD circuits in dual-rail configuration to implement the computations of the neuron. The structure of the DSD circuits may also be designed to implement the weights of an activation function or connection between neurons. Specifically, the value assigned to a display strand of a DSD circuit may implement the binary weights of +1 or −1.

Compiling the neural network may also involve comparing multiple simulations of the neural network. CRNs representing the neural network may be simulated using the chemical reaction transformation module 108. Multiple possible simulations may be compared to identify one or more CRN designs that maximize the distance of the combination of inputs for the neurons of the neural network from the respective decision boundaries of the neurons.

At 608, the DSD circuits compiled at 606 are obtained. The DSD circuits may be obtained from any source of oligonucleotides such as an oligonucleotide synthesizer, and in vitro cloning system, etc. If necessary to create the DSD circuits specified in the design of the neural network, the oligonucleotides may be further processed such as by digestion with restriction enzymes, clustered regularly interspaced short palindromic repeats (CRISPR)/Cas9 complexes, or other modifications.

At 610, the DSD circuits are combined at one or more physical locations. If the neural network is implemented in a one-pot system 120 then all of the oligonucleotides that make up the DSD circuits will be can find in the same physical location. However, all the component oligonucleotides of the neural network may not be combined together at the same time. Portions of the neural network may be added sequentially to DSD circuits for a previous portion of the neural network time to react. For example, there may be a delay after addition of annihilator components or thresholding components before addition of the next set of DSD circuits in order to provide sufficient time for the annihilators or thresholding components to fully react.

The DSD circuits may be combined in multiple physical locations if the neural network is implemented in a physically-separated system 122. The neural network may be physically divided by layer, neuron, or otherwise. For example, all the DSD circuits corresponding to all the neurons in a given layer may be combined in one physical location and the DSD circuits corresponding to the neurons and other layers may be combined at different physical locations. As another example, all the DSD circuits that correspond to a first neuron may be combined at a first physical location and all the DSD circuits that correspond to a second neuron may be combined at a second physical location. This may be repeated for some or all of the neurons in the neural network.

Combining the plurality of DSD circuits may also include anchoring a single-stranded oligonucleotide from one of the plurality of DSD circuits to a substrate. The substrate may be a nanoparticle, a gene chip, a silicon plate, a glass plate, etc. The oligonucleotide that is anchored may be part of a DSD circuit such as one of the strands of a seesaw gate. Additionally or alternatively, an oligonucleotide that is a signal such as an output oligonucleotide may be anchored to a substrate. Transmission of the signal through the neural network may be implemented by moving the substrate to which the output oligonucleotide is attached. Manipulation of oligonucleotides attached to substrates may be incremented by microfluidics or other systems as described above.

The physical division and the timing of adding oligonucleotides to different physical locations containing portions of the neural network may be determined by the compiler 110. Thus, the compiler 110 may determine more than just oligonucleotide sequences but also may determine the physical distribution of the DSD circuits and temporal order of combinations of oligonucleotides.

At 612, one or more input oligonucleotides are provided to the neural network and are classified by the neural network. The Neural Functioning as a classifier will classify input oligonucleotides according to the training examples provided to the neural network during the in silico training. They classifier implemented with DSD circuits can classify anything that a conventional computer-implemented neural network can classify so long as the inputs can be represented as oligonucleotide sequences. The massive parallelism possible with DNA computing may allow a neural network implemented with DSD circuits to perform classification on very large data sets faster than an electronic computer.

The input oligonucleotides may be mRNA molecules and the neural network may be implemented inside a cell. Classification of the mRNA molecules within the cell may identify a biological condition such as the probability of genes associated with cancer being activated in the cell, a viral infection in the cell, a cellular stress response, or the like. The input oligonucleotides may also be used to analyze DNA that functions as DNA data storage. DNA data storage uses the sequences of DNA molecules to store digital information such as computer files. A DNA data store comprises multiple DNA molecules that may be analyzed directly by a neural network implemented with DSD circuits. If an input oligonucleotide is present in a double-stranded configuration, it may be heated a temperature at which the double-stranded molecule separates into two single-stranded models that are then able to interact with DSD circuits.

Illustrative Computer Architecture

Figure 7:
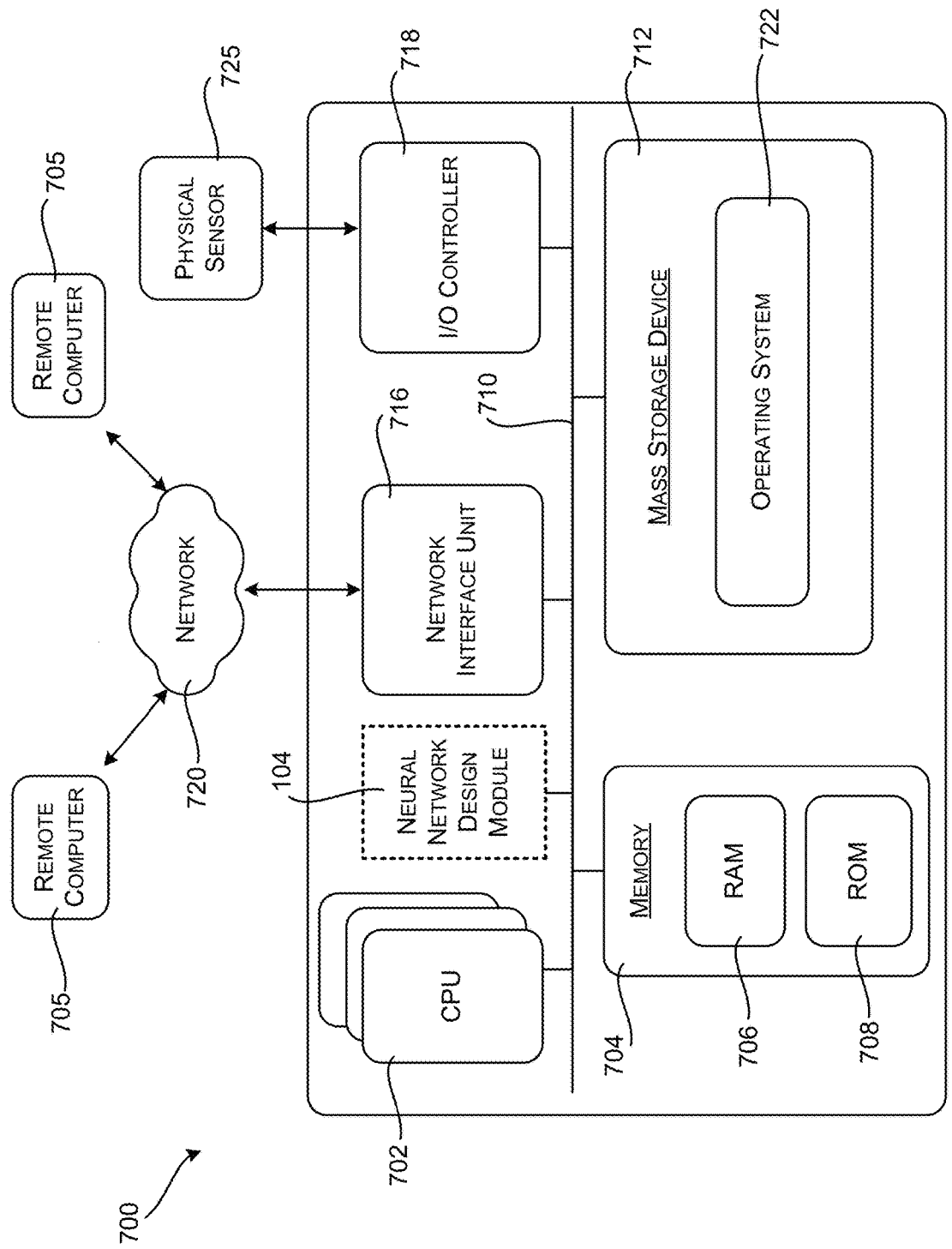
FIG. 7 is a computer architecture diagram showing an illustrative computer hardware and software architecture for a computing device that can act as an application host for the neural network design module presented herein.

FIG. 7 is a computer architecture diagram showing an illustrative computer hardware and software architecture for a computing device such as the electronic computing device 102 introduced FIG. 1. In particular, the computer 700 illustrated in FIG. 7 can be utilized to implement the neural network design module 104.

The computer 700 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system ("BIOS" or "firmware") containing the basic routines that help to transfer information between elements within the computer 700, such as during startup, can be stored in the ROM 708. The computer 700 further includes a mass storage device 712 for storing an operating system 722, application programs, and other types of programs. The mass storage device 712 can also be configured to store other types of programs and data.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer-readable media can be any available computer-storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 720. The computer 700 can connect to the network 720 through a network interface unit 716 connected to the bus 710. It should be appreciated that the network interface unit 716 can also be utilized to connect to other types of networks and remote computer systems. The computer 700 can also include an input/output controller 718 for receiving and processing input from a number of other devices, including a keyboard, mouse, touch input, an electronic stylus (not shown in FIG. 7), or a physical sensor such as a video camera. Similarly, the input/output controller 718 can provide output to a display screen or other type of output device (also not shown in FIG. 7).

It should be appreciated that the software components described herein, when loaded into the CPU 702 and executed, can transform the CPU 702 and the overall computer 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement many types of computing devices such as desktop computers, notebook computers, servers, supercomputers, gaming devices, tablet computers, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method of creating a neural network with DNA strand displacement gates, the method comprising: receiving, at an electronic computing device, a specification of the neural network comprising at least one hidden layer, wherein the specification indicates at least one oligonucleotide sequence as an input to the neural network; training neuron and connection weights of the neural network in silico with a loss function to create a trained neural network, wherein the loss function also maximizes a distance of a combination of inputs for a neuron in the at least one hidden layer from a decision boundary of the neuron; compiling the trained neural network to a plurality of DSD circuits; obtaining the plurality of DSD circuits; and combining the plurality of DSD circuits in one or more physical locations.

Clause 2. The method of clause 1, wherein the neural network is a binary neural network, each neuron in the at least one hidden layer has an activation function that specifies either a positive weight or a negative weight, and connections to neurons in the at least one hidden layer have either a positive weight or a negative weight.

Clause 3. The method of clause 2, wherein the loss function is a margin ranking loss function; and training neuron and connection weights of the neural network further comprises using stochastic gradient descent to minimize a derivative of the margin ranking loss function such that the absolute value of the weights of the inputs for the neuron is maximized.

Clause 4. The method of any of clauses 1-3, wherein compiling the trained neural network to a plurality of DSD circuits comprises compiling each input to the neuron as a pair of DSD gates in dual-rail configuration.

Clause 5. The method of any of clauses 1-4, wherein compiling the trained neural network further comprises comparing multiple different simulations of chemical reaction networks (CRNs) representing reactions of the neural network to identify one or more CRN designs that maximizes a distance of the combination of inputs for the neuron from the decision boundary of the neuron.

Clause 6. The method of any of clauses 1-5, wherein combining the plurality of DSD circuits in one or more physical locations comprises combining a same concentration of oligonucleotides for each DSD circuit in each neuron in the at least one hidden layer.

Clause 7. The method of any of clauses 1-6, wherein combining the plurality of DSD circuits in one or more physical locations comprises combining a first plurality of DSD circuits corresponding to a first neuron at a first physical location and combining a second plurality of DSD circuits corresponding to a second neuron at a second physical location.

Clause 8. The method of any of clauses 1-7, wherein combining the plurality of DSD circuits in one or more physical locations comprises anchoring a single-stranded oligonucleotide from a one of the plurality of DSD circuits to a substrate.

Clause 9. The method of any of clauses 1-8, wherein the input to the neural network comprises a mRNA molecule; and further comprising classifying the mRNA molecule using the neural network.

Clause 10. The method of any of clauses 1-9, wherein the input to the neural network comprises an oligonucleotide storing digital data; and further comprising classifying the oligonucleotide using the neural network.

Clause 11. A binary neural network (BNN) implemented with DNA strand displacement gates, the binary neural network comprising: an input layer; a plurality of hidden layers, wherein a neuron in the plurality of hidden layers is implemented with at least one DSD circuit, the DSD circuit comprising: a first double-stranded oligonucleotide in which a single-stranded oligonucleotide representing a positive input displaces a first single-stranded output oligonucleotide, and a second double-stranded oligonucleotide in which a single-stranded oligonucleotide representing a negative input displaces a second single-stranded output oligonucleotide; and an output layer.

Clause 12. The BNN of clause 11, wherein the DSD circuit is implemented as a seesaw gate or as a two-domain gate.

Clause 13. The BNN of any of clauses 11-12, wherein the neuron comprises a plurality of DSD circuits each having a positive weight or a negative weight to implement weights of incoming signals and an activation function having a positive weight or a negative weight to implement a weight of the neuron.

Clause 14. The binary neural network of clause 13, wherein a difference between a number of DSD circuits having a positive weight and a number of input DSD circuits having a negative weight is at least three.

Clause 15. The binary neural network of any of clauses 11-14, wherein the plurality of hidden layers comprise: a first neuron of a first one of the plurality of hidden layers located at a first physical location; and a second neuron of a second one of the plurality of hidden layers located at a second physical location, wherein an output of the first neuron is moved from the first physical location to the second physical location and functions as an input to the second neuron.

Clause 16. An analog binary-neuron implemented with DNA strand displacement circuits, the neuron comprising: a pair of DSD circuits for each input to the neuron, wherein a first one of the pair of DSD circuits responds to a positive incoming binary signal and a second one of the pair of DSD circuits responds to a negative incoming binary signal and wherein each pair of DSD circuits releases either positive displacement strands or negative displacement strands; and a threshold component or annihilator component that consumes the least numerous of the positive displacement strands or the negative displacement strands.

Clause 17. The neuron of clause 16, wherein the positive incoming binary signal or the negative incoming binary signal is an oligonucleotide that is an output signal of another neuron in a previous layer of a BNN.

Clause 18. The neuron of any of clauses 16-17, further comprising an output gate that releases a first output signal in response to the positive displacement strands being most numerous and releases a second output signal in response to the negative displacement strands being most numerous.

Clause 19. The neuron of clause 18, wherein a negative weight is implemented for the neuron by an output signal having a different value than the most numerous displacement strand and a positive weight is implemented for the neuron by the output signal having a same value as the most numerous displacement strand.

Clause 20. The neuron of any of clauses 16-19, wherein the first one of the pair of DSD circuits responds to the positive incoming binary signal by releasing positive displacement strands when a weight of the input is positive and by releasing negative displacement strands when a weight of the input is negative, and wherein the second one of the pair of DSD circuits responds to the negative incoming binary signal by releasing positive displacement strands when a weight of the input is negative and by releasing negative displacement strands when a weight of the input is positive.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention are to be construed to cover both the singular and the plural, unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced. As used herein, "approximately" or "about" or similar referents denote a range of ±10% of the stated value.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Furthermore, references have been made to publications, patents and/or patent applications throughout this specification. Each of the cited references is individually incorporated herein by reference for its particular cited teachings as well as for all that it discloses.

The invention claimed is:

1. A binary neural network (BNN) implemented with DNA strand displacement gates, the binary neural network comprising:
   an input layer;
   a plurality of hidden layers, wherein a neuron in the plurality of hidden layers is implemented with at least one DSD circuit, the DSD circuit comprising:
      a first double-stranded oligonucleotide in which a single-stranded oligonucleotide representing a positive input displaces a first single-stranded output oligonucleotide, and
      a second double-stranded oligonucleotide in which a single-stranded oligonucleotide representing a negative input displaces a second single-stranded output oligonucleotide; and
   an output layer.

2. The BNN of claim 1, wherein the DSD circuit is implemented as a seesaw gate or as a two-domain gate.

3. The BNN of claim 1, wherein the neuron comprises a plurality of DSD circuits each having a positive weight or a negative weight to implement weights of incoming signals and an activation function having a positive weight or a negative weight to implement a weight of the neuron.

4. The binary neural network of claim 3, wherein a difference between a number of DSD circuits having a positive weight and a number of input DSD circuits having a negative weight is at least three.

5. The binary neural network of claim 1, wherein the plurality of hidden layers comprise:
   a first neuron of a first one of the plurality of hidden layers located at a first physical location; and
   a second neuron of a second one of the plurality of hidden layers located at a second physical location, wherein an output of the first neuron is moved from the first physical location to the second physical location and functions as an input to the second neuron.

* * * * *